July 24, 1962 W. HILL ET AL 3,045,640
BREADING APPARATUS
Filed Aug. 9, 1960 2 Sheets-Sheet 1
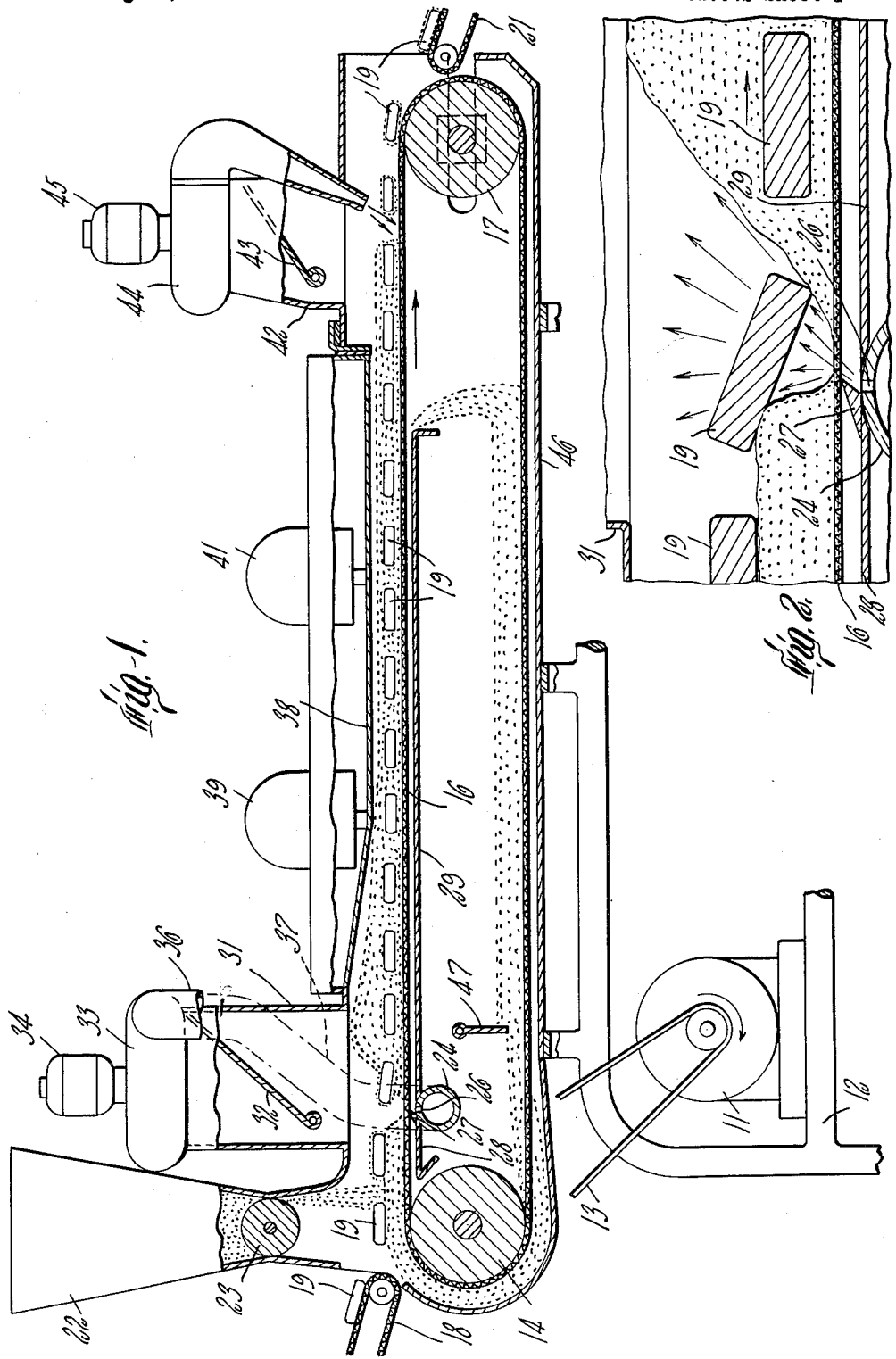

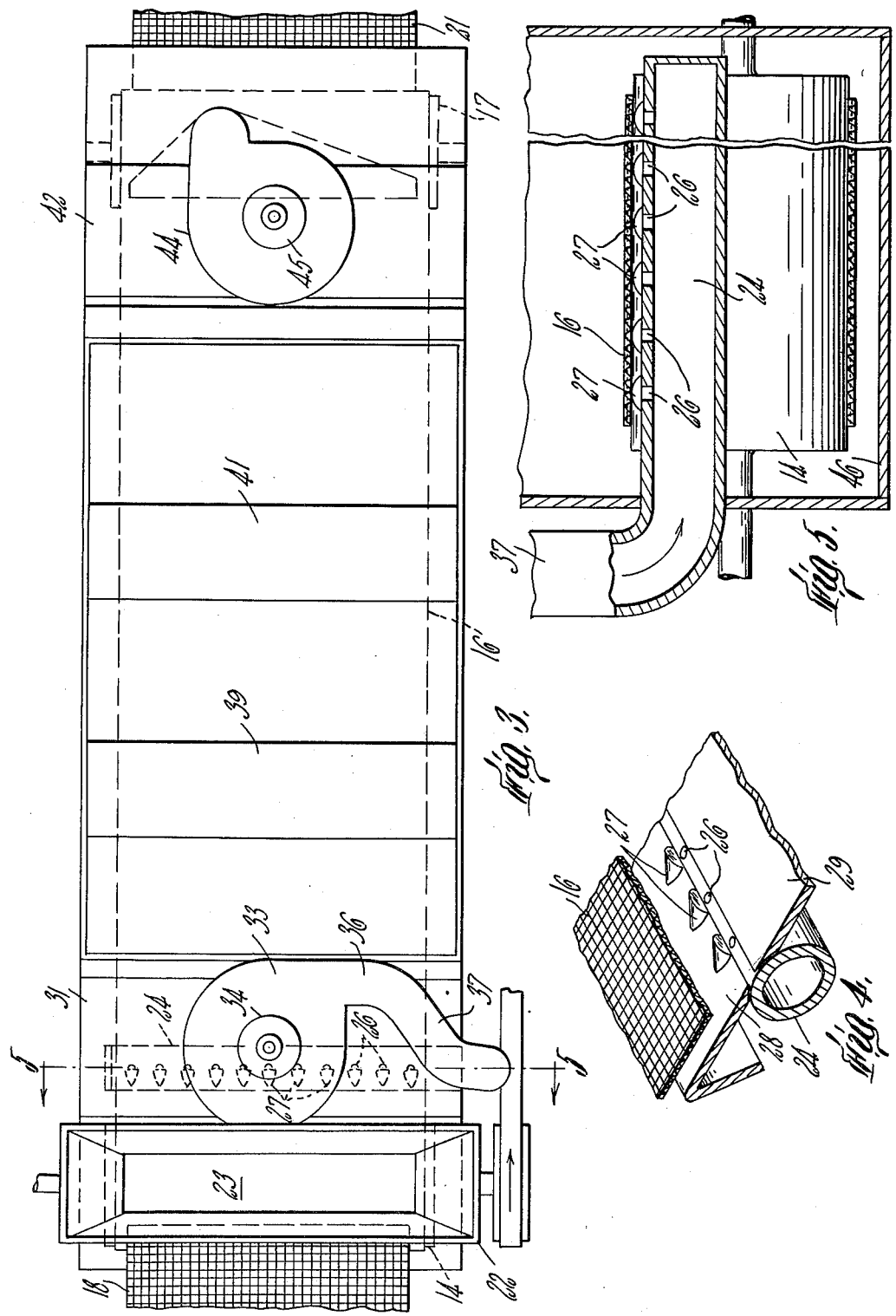

United States Patent Office 3,045,640
Patented July 24, 1962

3,045,640
BREADING APPARATUS
William Hill, Belmont, and Donald H. Lounsbury, Reading, Mass., assignors to J. W. Greer Company, Wilmington, Mass., a corporation of Massachusetts
Filed Aug. 9, 1960, Ser. No. 48,418
5 Claims. (Cl. 118—16)

This invention relates to apparatus for applying an overall coating of comminuted material to various products, and more particularly relates to a breading machine for food products such as fish-sticks, fish filets, croquettes, shrimp, oysters, chicken, hamburg and so forth.

The general object and purpose of the invention is to provide a less complex machine of the above-mentioned character which requires less maintenance and yet operates equally as fast if not faster than any other machine of this character.

The novel features of the invention together with further objects and advantages thereof will become apparent from the following detailed description and the drawing to which it refers.

In the drawing:

FIG. 1 is a sectional view of the machine according to the present invention;

FIG. 2 is a fragmentary view of the machine illustrating on an enlarged scale the effect of the upwardly directed air jets;

FIG. 3 is a plan view of the machine;

FIG. 4 is a perspective view of the apertured duct and deflecting elements which produce the upwardly directed air jets; and FIG. 5 is a sectional view taken on line 5—5 of FIG. 3.

With reference now to the drawing and more particularly to FIG. 1, it will be observed that the numeral 11 designates a motor for driving the machine, and the numeral 12 designates a part of the frame of the machine on which the motor 11 is mounted. Connected to the motor by means of a belt 13 is the drive roll 14 for a wire mesh belt 16 which, as shown, travels in an endless path around a tension roll 17. The tension roll has a very nearly horizontal displacement with respect to the drive roll so that there are two traverses of the belt, one above the other and very nearly parallel. The tension roll 17 is the same diameter as roll 14 and is also driven. The direction of rotation of the motor is clockwise so that the upward traverse which carries the products is the forward direction, and the lower traverse is the return. As shown toward the left of the machine, an optional form of transfer conveyor belt 18 is employed to deliver the products 19 to the machine, and a similar conveyor 21 is employed to carry away the products at the end of the forward traverse toward the right of the machine.

Comminuted material which is to be embedded in the products is loaded into a hopper 22 which is disposed above the forward traverse of the belt at a point near the start thereof. In the throat of the hopper is a roll 23 for metering the discharge of comminuted material onto the products. Disposed beneath the forward traverse of the belt at a point slightly beyond the hopper is a transversely directed duct 24 for air which is provided with a row of transversely spaced apertures 26. Each aperture has associated with it an air-deflecting element 27 which, as best shown in FIG. 4, is carried by a horizontal plate or tray 28 underlying the belt. Tray 28 extends between the drive roll and the duct 24, and coextensive therewith is a tray 29 extending approximately three-quarters of the way from the duct 24 to the guide roll 17. In other words, the tray 29, the duct 24, and the tray 28 together provide a continuous surface underneath the forward traverse of the belt and slightly spaced therefrom to maintain a layer of comminuted material thereon and prevent comminuted material from dropping down onto the return traverse.

Disposed above the belt adjacent the hopper 22 is a housing 31 having an inclined baffle 32. Baffle 32 serves to form two compartments within the housing that are open to the region immediately above the belt. The opening into the compartment toward the left is seen to be the smaller. Mounted on top of the housing is a centrifugal fan 33 driven by a motor 34. The outlet 36 from the fan is connected to the transverse duct 24 by a curved duct 37, and the inlet to the fan communicates with the compartment on the left side of the housing. There is no direct communication to the other compartment by virtue of the fact that the uppermost edge of the baffle 32 is tight against the housing wall.

Adjacent the housing there extends above the belt a cover plate 38 which is movable up and down under the influence of a pair of vibrators 39 and 41. The cover plate is seen to extend to a point just beyond the underlying tray 29. The vibrators can be of any conventional type that are readily available commercially. In addition, there is provided immediately beyond the cover plate a housing 42 having a baffle 43 and mounting a centrifugal fan 44 and motor 45. As shown, the housing and associated elements are similar to those adjacent the hopper 31. In this case, however, the outlet of the fan is connected to a discharge nozzle disposed directly above the belt. Finally, the return traverse of the belt is provided with an underlying plate or tray 46 which follows the belt around in the transition region between the return traverse and the start of the forward traverse. A metering gate 47 is located a short distance in front of drive roll 14 to control the flow of comminuted material to the forward traverse of the belt circuit.

In operation, after the products have been delivered to the machine by the transfer conveyor and after comminuted material has been discharged upon the products from above by the roll in the hopper, the products next come under the influence of the upwardly directed air jets emanating from the duct 24. As a result of these jets, the bed of comminuted material onto which the products were initially deposited, and the additional material discharged onto them from the hopper, is blown upwardly into the housing 31. Because of the provision of the deflecting elements, however, the jets and hence the air blown comminuted material is not directed vertically but rather at an angle. The baffle insures that the intake to the fan is substantially free of the material even though the path of circulating air induced by the fan is essentially a closed one. That is to say, instead of being circulated by the fan, the air-blown comminuted material is deflected by the baffle and thereby caused to fall back upon the conveyor belt.

The effect of this action on the products is to effectively submerge them in the comminuted material as is clearly shown in FIG. 2.

In addition, where the product is covered with a wet batter as it comes from the transfer conveyor, the batter often tends to flow down the sides of the product making a tail of breading and batter on the product which is either wasted or mars the appearance of the finished product. The stream of air from apertures 26 tends to reverse the natural tendency of such batter to flow downwardly and holds it in position or blows it upward mixing comminuted material with it. The action of the air and comminuted material on the batter thus stops flow downward, eliminating the formation of undesired tails.

Further travel of the products brings them under the influence of the vibrating plate 38. The plate serves to compact the comminuted material and firmly embed it in the products. This process can be closely regulated either by control of the vibration amplitude of the plate or the speed of travel of the belt.

To complete the breading operation on the products, it remains only to remove the excess comminuted material. This is accomplished by the blower at the right of the machine which blows such material off the products and down through the open-mesh belt onto the return traverse. Previously, most of the excess material will have fallen of its own accord to the return traverse upon the termination of the tray 29 underlying the forward traverse. This excess material is carried along by the return traverse to the transition region at the drive roll 14 where the control gate 47 overlying the return traverse serves to maintain a layer of comminuted material of suitable depth on the belt. It is upon this layer or bed that the products are initially deposited by the transfer conveyor in the manner described in the foregoing.

Although the invention has been described in connection with a single preferred embodiment, it will be appreciated that various modifications of this embodiment are possible that are within the spirit and scope of the invention. Therefore, the invention should not be deemed to be limited to the details of what has been described herein but rather it should be deemed to be limited only by the scope of the appended claims.

What is claimed is:

1. Apparatus for applying comminuted material to food products and the like, including an open mesh conveyor, means underlying a traverse of said conveyor for retaining thereon a continuous layer of comminuted material onto which the products are deposited, a discharge hopper above an initial portion of said traverse for discharging comminuted material onto said conveyor to form said layer, means to apply air upwardly beneath said layer to scatter said comminuted material, means overlying said conveyor to deflect the air-blown comminuted material causing it to fall back on said conveyor and the products to be submerged therein, means to embed said comminuted material in the products, and means to separate from the products the excess comminuted material not embedded therein.

2. Apparatus for applying comminuted material to food products and the like, including an open-mesh conveyor, means underlying a traverse of said conveyor for retaining thereon a continuous layer of comminuted material onto which the products are deposited, a discharge hopper above an initial portion of said traverse for discharging comminuted material onto said conveyor to form said layer, means to apply air upwardly beneath said layer to scatter said comminuted material, means overlying said conveyor to deflect the air-blown comminuted material causing it to fall back on said conveyor and the products to be submerged therein, means to embed said comminuted material in the products, and means disposed beyond said retaining means to apply air downwardly from above said layer to separate from the products excess comminuted material not embedded therein.

3. Apparatus for applying comminuted material to food products and the like including an open-mesh conveyor, means underlying a traverse of said conveyor for retaining thereon a continuous layer of comminuted material onto which the products are deposited, a discharge hopper above an initial portion of said traverse for discharging comminuted material onto said conveyor to form said layer, means to apply air upwardly from beneath said layer to scatter said comminuted material, a housing overlying said conveyor in the vicinity of said means to blow air upwardly, said housing having a baffle to deflect the air-blown comminuted material causing it to fall back onto said traverse of the conveyor and the products to become submerged therein, a vertically movable plate overlying said layer of comminuted material beyond said housing, means to cause said plate to vibrate up and down compacting said comminuted material and causing it to become embedded in the products, and means disposed beyond said retaining means to blow air downwardly from above said layer and to separate from the products excess comminuted material not embedded therein.

4. Apparatus for applying comminuted material to food products and the like, including an open-mesh conveyor, a plate underlying a traverse of said conveyor for retaining thereon a continuous layer of comminuted material into which the products are deposited, a discharge hopper above an initial portion of said traverse for discharging comminuted material onto said conveyor to form said layer, a manifold extending transversely of said conveyor traverse coextensive with said underlying plate, said manifold having air discharge outlets for applying air upwardly from beneath said layer and scattering said comminuted material, a housing overlying said conveyor traverse in the vicinity of said manifold, said housing having a baffle to deflect the air-blown comminuted material causing it to fall back onto said conveyor and the products to become submerged therein, means to embed said comminuted material in the products, and means disposed beyond said retaining means to blow air downwardly from above said layer and to separate from the products the excess comminuted material not embedded therein.

5. Apparatus for applying comminuted material to food products and the like including an open-mesh conveyor having a forward and a return traverse, a first plate underlying said return traverse and a second plate underlying all but a terminal portion of said forward traverse for retaining on said conveyor a continuous layer of comminuted material, said products being deposited onto the layer of comminuted material carried by said forward traverse of the conveyor, a discharge hopper above an initial portion of said forward traverse to discharge comminuted material onto the products, a manifold disposed beyond said discharge hopper, said manifold extending transversely of said conveyor coextensive with said underlying plate and having discharge outlets to blow air upwardly from beneath said layer of comminuted material to scatter the same, a housing overlying said layer of comminuted material in the vicinity of said manifold, said housing having a baffle to deflect the air-blow comminuted material, causing it to fall back onto said conveyor and the products to become submerged therein, a vertically movable plate overlying said layer of comminuted material beyond said housing, means to cause said plate to vibrate up and down compacting said comminuted material and causing it to become embedded in the products, an air nozzle disposed above said layer of comminuted material on said forward traverse at a point beyond said second plate, said nozzle blowing air downwardly from above said layer to separate from the products excess comminuted material not embedded therein, said excess comminuted material being returned to the initial portion of said forward traverse by said return traverse of the conveyor, said first plate extending around said conveyor in the transition region between the end of said return traverse and the initial portion of said forward traverse to maintain said layer of comminuted material on said conveyor.

References Cited in the file of this patent

UNITED STATES PATENTS

| 1,801,572 | Salerno | Apr. 21, 1931 |
| 2,855,893 | Greer et al. | Oct. 14, 1958 |